United States Patent [19]
Gunsher et al.

[11] 3,846,469
[45] Nov. 5, 1974

[54] ISOPROPYLIDENE BIS(2,6-DIHALO-P-PHENYLENE) BIS(POLY-HALOPHENYL) CARBONATES

[75] Inventors: Jeffrey A. Gunsher; R. Garth Pews, both of Midland, Mich.

[73] Assignee: The Dow Chemical Company, Midland, Mich.

[22] Filed: June 12, 1972

[21] Appl. No.: 261,666

[52] U.S. Cl.......... 260/463, 260/45.7 R, 260/45.85, 260/45.7 P, 260/45.75 K, 260/45.75 R, 260/45.95
[51] Int. Cl. .... C07c 69/00, C08k 1/36, C08f 45/00
[58] Field of Search..................................... 260/463

[56] References Cited
UNITED STATES PATENTS

| | | | |
|---|---|---|---|
| 3,382,207 | 5/1968 | Jacquiss............................ | 260/45.7 |
| 3,688,001 | 8/1972 | Exner et al. ....................... | 260/463 |

FOREIGN PATENTS OR APPLICATIONS

| | | |
|---|---|---|
| 2,007,804 | 1/1970 | France |

OTHER PUBLICATIONS

Ismail et al., Journal fur Praktische Chemie, Vol. 311, pp. 656–659, (1969).
Chemical Abstracts 7th Index Vol. 50–65, Subject Index, p. 16904S (1970).

*Primary Examiner*—Lewis Gotts
*Assistant Examiner*—Diana G. Rivers
*Attorney, Agent, or Firm*—Sidney J. Walker

[57] ABSTRACT

New organic compounds comprising isopropylidene bis(2,6-dihalo-p-phenylene)bis(polyhalophenyl)carbonates. These new compounds have demonstrated utility as fire retardant additives for various polymers.

2 Claims, No Drawings

ISOPROPYLIDENE BIS(2,6-DIHALO-P-PHENYLENE) BIS(POLY-HALOPHENYL) CARBONATES

BACKGROUND OF THE INVENTION

Various halogenated polyphenyl esters have been prepared. In general, halogenated compounds are known to be fire retardants and, for example, halogenated diphenyl oxide has been found to be a suitable fire retardant for polyester. Yet compounds which have greater thermal stability and better fire retardancy have been sought.

SUMMARY OF THE INVENTION

It has now been discovered according to the present invention that isopropylidene bis(2,6-dihalo-p-phenylene)bis-(polyhalophenyl)carbonates of the general formula

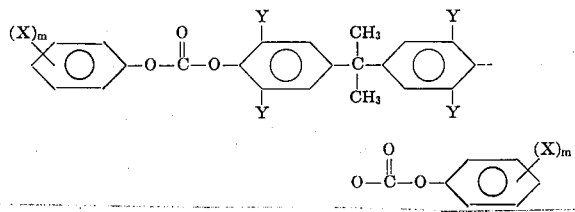

wherein Y is Br or Cl,
each X is independently Br or Cl and $m$ is an integer of 3 to 5,
are very desirable fire retardants for a variety of polymers. In the invention, the polymer is physically mixed with the halogenated polyphenyl compound of the invention to obtain a product which is resistant to burning while at the same time it substantially retains the desirable properties of the original polymer.

The compounds of the present invention may contain 10–14 bromine atoms, 10–14 chlorine atoms or a mixture of 10–14 bromine and chlorine atoms nucleated on the 4 aromatic ring structures. Preferred compounds of the present invention contain only bromine, with those which contain 10 or 14 bromine atoms being especially preferred. Of greatest interest because of this special effectiveness as a fire retardant additive are isopropylidene bis(2,6-dibromo-p-phenylene)bis-(2,4,6-tribromophenyl carbonate and isopropylidene bis(2,6-dibromo-p-phenylene)bis(pentabromophenyl)carbonate.

Although the compounds of the present invention are preferably those containing only bromine as the halogen, they may be any of those described in the general formula above. They would also include such obvious equivalents having inert substituents on the two outer aromatic nuclei such as F, I, methyl, phenyl, hydroxy, methoxy, nitro, carboxy, acetoxy, cyano or sulfo. The positioning of the substituents on these rings does not substantially affect the fire retardancy of the compounds.

The compounds of the present invention are desirable as fire retardants for polymers because of their good thermal stability and lower volatility.

The compounds of the invention may suitably be added to any compatible resin in amounts sufficient to give the desired degree of fire retardancy. The amount required to give a desirable fire retardant polymer varies widely depending upon the particular polymer, the shape of the polymer in the final form and the fire retardancy desired. Thus, in the practice of this invention, the halogenated polyphenyls claimed and described herein are incorporated into the polymer in a fire retarding amount. By "fire retarding amount" is meant that amount of the fire retardant additive comprising the halogenated polyphenyl ester which when present in the polymer measurably reduces the tendency of the polymer to burn. In preferred compositions, about 1 to about 20% (by weight of the polymer) of the halogenated polyphenyl ester of the invention may be incorporated into the polymeric material. Polymers containing about 5 to about 10% by weight of the halogenated polyphenyl esters of the invention are of special interest because of the very good fire retardancy obtained without sacrifice to the desirable properties of the polymer.

Within these concentrations and ranges and preferred concentrations and ranges, the particular concentrations and ranges used in a particular mixture will vary depending on the amount of fire retardancy desired at the concessions to the property of the polymer such as thermal stability, color, toxicity and odor that can be yielded. The determination of these concentrations and ranges with the above in mind can easily be obtained by those skilled in the art especially with the aid of the many examples given below.

Any resin in which a compound of the invention is compatible may be made fire resistant by this invention, with resins containing polyesters, polyolefins and polyamides being of special interest.

Specifically, one may incorporate the fire retardants of the invention into the α-olefin polymer such as the homopolymers and copolymers, etc., containing as the major constituent thereof a monovinylidene carbocyclic aromatic polymer, polypropylene, high density polyethylene and the like.

For the purposes of this invention, the term "monovinylidene carbocyclic aromatic polymer" means a homopolymer or copolymer of monovinylidene carbocyclic aromatic monomer in which at least 50 weight percent is polymerized monovinylidene aromatic carbocyclic monomer such as styrene, α-methylstyrene, ar-t-butylstyrene, ar-methylstyrene, ar-chlorostyrene, ar-bromostyrene, and mixtures thereof, and the remainder is polymerized ethylenically unsaturated monomer such as aliphatic conjugated diene, e.g., butadiene and isoprene; α,β-ethylenically unsaturated nitrile, e.g., acrylonitrile, fumaronitrile, and methacrylonitrile; and other α,β-ethylenically unsaturated monomers such as ethylacrylate, methyl methacrylate, maleic anhydride, vinyl acetate, vinyl benzoate, acrylamide, vinylmethyl ether, vinylmethyl ketone, acrylic acid, methacrylic acid and mixtures thereof. Small amounts of crosslinking monomers such as divinyl benzene are also suitably employed in the monovinylidene carbocyclic aromatic polymer.

Preferably, the monovinylidene carbocyclic aromatic polymer is a rubber modified polymer, e.g., high impact polystyrene containing from about 2 to about 25 weight percent of a diene rubber such as polybutadiene, elastomeric styrene/butadiene copolymer inclusive of the random, block and graft varieties, and polyisoprene or an ethylene/propylene rubber. Also preferred are the so-called ABS resins, i.e., terpolymers of styrene, butadiene and acrylonitrile, and terpolymers of styrene, butadiene and maleic anhydride. It is further understood that unmodified styrene homopolymer, so-called general purpose polystyrene, is suitably employed in the practice of this invention.

Representative examples of polyesters in which the fire retardant compositions of the present invention may be employed include polyethylene terephthalate and poly(1,4-cyclohexylenedimethylene terephthalate) sold under the trade name Kodel II. Polyethylene terephthalate is of special interest because of its commercial importance.

Any resin containing a major amount of polypropylene in which the additives are compatible may be made fire retardant by the use of the compounds of the present invention in the indicated concentrations and ranges.

Hompolymers and copolymers of propylene are well known and readily available on a commercial scale. Homopolymerized polypropylene is usually sold in the form of isotactic polypropylene although it is also available in the atactic. The polypropylene may be in any form such as solids, fibers and the like. Copolymers of propylene that may be made fire retardant include those prepared by copolymerization of propylene with $\alpha$-olefins such as ethylene and butylene, and with other ethylenically unsaturated monomers such as styrene, acrylonitrile, acrylamide, acrylic acid, butadiene and the like. Copolymers of propylene and ethylene are preferred, with copolymers containing at least 80% by weight propylene and homopolymer polypropylene being especially preferred. Such polymers and copolymers of propylene are referred to herein as "polypropylene."

Representative examples of polyamides retarded against burning by the present invention include those shown by Kirk-Othmer, Encyclopedia of Chemical Technology, Second Edition, Vol. 16, at page 2 with nylon-6 and nylon-6,6 being of special interest because of their commercial availability.

In instances wherein the foamed articles of suitable polymers such as the $\alpha$-olefins are desired, a blend of the aforementioned essential ingredients and a blowing agent, preferably a solid material, which blends stable at temperatures used for blending the ingredients, is prepared in a manner to provide a uniform dispersion of the fire retardant additive and the blowing agent in the polymer. The resulting composition may then be molded in the form such as a cavity mold at temperatures sufficient to activate the blowing agent. Other conventional techniques for making foamed polymers are also suitably employed.

The fire retardant additives incorporated in the resins may contain various stabilizers, such as tridecyl phosphite, barium-cadmium soaps and organo tin compounds or other materials which inhibit discoloration. Although stabilizers are generally unnecessary with the pure retardants of the invention, commercial grades of the fire retardants sometimes contain impurities which cause discoloration at high temperatures. With proper stabilization or purified additives, however, fire retardant polystyrene, for example, may be molded or extruded at temperatures above 200°C. with degradation or discoloration.

Although the compounds of the invention are effective fire retardants when used alone, other known additives may be used in addition to or in partial substitution for these compounds. Representative examples of other additives include antimony oxide, a peroxide, triethylphosphate, dibromoneopentyl glycol or other brominated compounds.

The novel fire retardants claimed herein may be added to the various polymers by any known method. That is to say, the fire retardant components may be added to the polymer by (1) blending the polymers and the component in, for example, a Brabender Plasticorder, (2) milling the polymer and components on a 2-roll mill, in a Banbury mixer, etc., (3) molding the components and the polymer simultaneously, (4) extruding the polymer and components or (5) blending all the materials together in powder or liquid form and thereafter forming the desired ultimate product. Additionally, the fire retardant compositions may be added during the production of the polymer, i.e., during the monomer polymerization, provided, however, that the catalyst, etc., other conditions and other ingredients of the polymerization system are inert thereto.

The polymers containing the fire retardants of the present invention are conveniently prepared by making a melt of the polymer and the fire retardant composition and mixing the liquids in the desired proportions until an essentially homogeneous mixture is obtained. The mixture is then processed in the same manner as the original polymer, for example, the mixture is cooled, ground to a powder and molded into the desired form.

SPECIFIC EMBODIMENTS

Example 1 — Preparation of Isopropylidene(2,6-dibromo-p-phenylene)bis(2,4,6-tribromophenyl)carbonate To a reactor equipped with stirrer and reflux condenser, tetrabromobisphenol A (13.6 g., 0.025 mol) and 2,4,6-tribromophenylchloroformate (19.7 g., 0.05 mole) were dissolved in benzene and pyridine (6 ml.) added dropwise. The solution was stirred for 2 hours at room temperature and the suspended solids filtered and washed with water. The crude product was digested in boiling methanol for 15 minutes, cooled and filtered to give 20.0 g. product having a melting point of 257-260°C. The parent ion was observed m/e 1248. Elemental analysis for $C_{29}H_{14}Br_{10}O_6$ was calculated to be C, 27.70; H, 0.80; Br, 62.58. Found: C, 27.44; H, 1.26; Br, 62.8.

Examples 2–6 — Fire Retardancy in Saturated Polyester

Using the screening method ASTM D-2863, the compound of Example 1 was tested as a fire retardant in saturated polyester. In the test procedure, a mixture of polyethylene terephthalate and the desired amount of the fire retardant compound to give the indicated percentage of bromine were mixed at 265°C. using a Brabender mixer. After mixing for the several minutes the mixture was then removed from the mill and ground to a powder in a Waring Blender. A sample was then fabricated by molding it at a pressure of 2,000 psi at 300°C. on a fiberglass support. The hot sandwich was then placed in the second press and a light pressure (100–300 psi) was applied while the sample cooled to room temperature. When the sample was cold it was removed and cut into strips ½ inch × 7 inches × ⅛ inch. The samples were then burned in a limiting oxygen index test (LOI as described in Combustion and Flame, 10, 135 (1966). The higher the LOI, the more fire retardant the sample is. The results of these tests are shown in Table I.

TABLE I

Fire Retardancy in Saturated Polyester Using the Compound of Example 1

| Wt. % Br | Gm Cpd. | Wt. Cpd. + Polyester | LOI |
|---|---|---|---|
| 0 | 0 | 75 g. | 0.205 |
| 3 | 3.54 | 75 | 0.278 |
| 5 | 5.90 | 75 | 0.289 |
| 7 | 8.25 | 75 | 0.318 |
| 10 | 12.58 | 80 | 0.343 |

Examples 7–11 — HLT-15 Intermittent Flame Test Using Isopropylidene bis(2,6-dibromo-p-phenylene)bis(2,4,6-tribromophenyl)carbonate The fire retardant effect of various levels of this compound in polyethylene terephthalate molded with two pieces of fiberglass mat was tested by a modified HLT-15 Intermittent Flame Test. The tests are the same as HLT-15 specification except in the modified test, the samples were suspended at a 45° angle with a wire holder and the flame was applied vertically underneath the sample. The test is designed to determine the self-extinguishing quality of resins in the form of fiberglass mat reinforced laminates. The material tested herein was ⅛ × ½ × 7 inches long. The edges were smooth and rectangular. The application of the flame was by use of a 7/16 inch tirrell burner. The flame was adjusted to 1½ inch inter blue cone with a flame height of approximately 5 inches. Care was taken to have the access of the burner at an angle of 90° from horizontal and all tests were made under draft free conditions. The specimens were clamped at a 45° angle on a wire holder as indicated and the tip of the inner blue cone of the flame just touched the lower edge of the ½ dimension of the specimen. Each of the ignitions were made at a slightly higher point on the sample so as to not attempt to burn an area which consisted mainly of the fiberglass support only. The total difference in distance was 1 to 2 inches. The results of these tests are shown in Table II. Higher HLT-15 scores indicate a higher degree of fire retardancy.

TABLE II

Modified HLT-15 Tests on Polyethylene Terephthalate Containing Various Amounts of the Compound of Example 1

| Wt. % Bromine | Gm Cpd. | Wt. Cpd. + Polyester | Mod. HLT-15 |
|---|---|---|---|
| 0 | 0 | 75 | 0 |
| 3 | 3.54 | 75 | 4 |
| 5 | 5.90 | 75 | 12 |
| 7 | 8.25 | 75 | 20 |
| 10 | 12.58 | 80 | 36 |

Example 12

With a polystyrene resin, 13% of the compound of Example 1 based on the weight of the polystyrene was blended along with 3.5 weight percent of $Sb_2O_3$. The mixture was blended and molded into strips and the fire retardancy determined by Underwriter Laboratory Test, "Subject 94," Dec. 9, 1959. The material was rated as "Self-Extinguishing, Group I." This classification is applied under UL-94 to materials where the duration of flaming of glowing combustion of vertical specimens after application of the test flame does not exceed 25 seconds and which materials do not drip any flaming particles or droplets during the burning test.

In the same manner as described in the examples above, other polyhalophenoxy tetrahalobisphenol-A carbonates are used to make polymers fire retardant. These include isopropylidene bis-(2,6-dichloro-p-phenylene), bis-(2,4,6-tribromophenyl)carbonate; isopropylidene bis-(2,6-dibromo-p-phenylene)-bis-(2,4,6-trichlorophenyl)carbonate; isopropylidene bis-(2,6-dibromo-p-phenylene)bis-(pentachlorophenyl)carbonate; mixed halogenated derivatives such as isopropylidene bis(2,6-dibromo-p-phenylene)bis(tribromochlorophenyl)carbonate; and compounds having inert substituents such as isopropylidene bis(2,6-dibromo-p-phenylene)-bis(tetrabromonitrophenyl)carbonate and the like.

Also in the same manner as shown in the examples above for polyethylene terephthalate, other saturated polyesters such as Kodel polyesters, and nylons such as nylon-6,6, nylon-4,10 and nylon-4,6 are made fire retardant by the addition of the compounds of the invention. Similarly, polypropylene containing 1–20% by weight of the compounds of the present invention are rendered fire retardant in an efficient manner as the melting point of the compounds of the present invention are within the range of the fabrication temperatures of polypropylene.

We claim:
1. A compound of the general formula

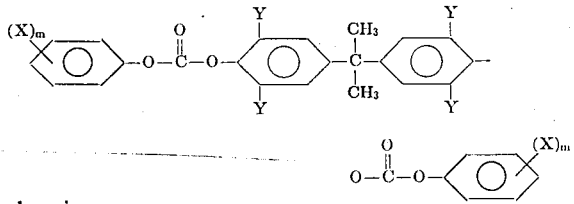

wherein
each X is independently Br,
Y is Br, and
m is an integer of 3 to 5.
2. A compound of claim 1 wherein m is 3.